Jan. 26, 1932.  W. E. GHENT  1,842,399
LOADING MACHINE
Filed Nov. 3, 1930   2 Sheets-Sheet 2
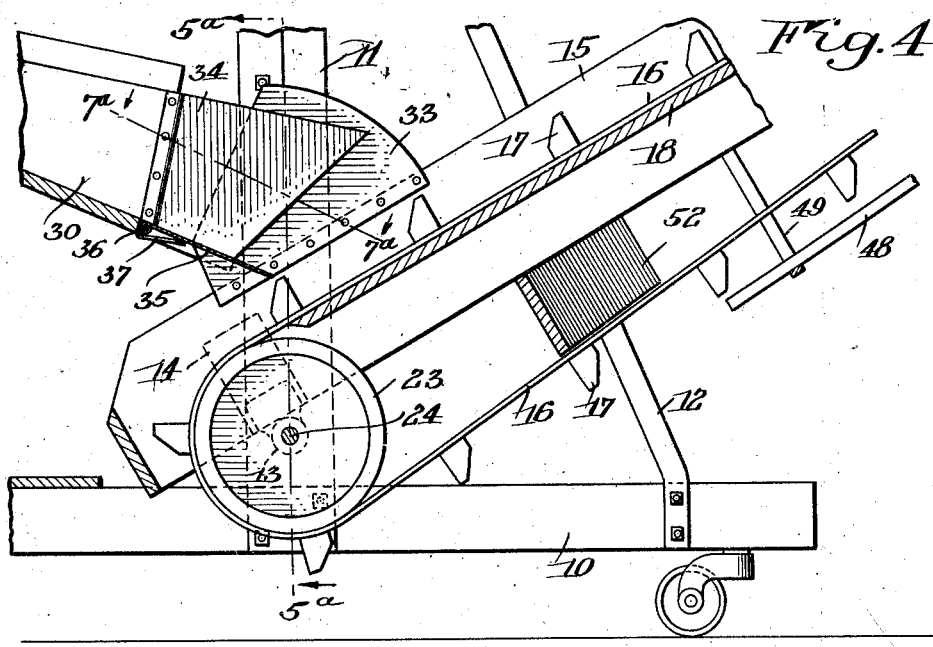
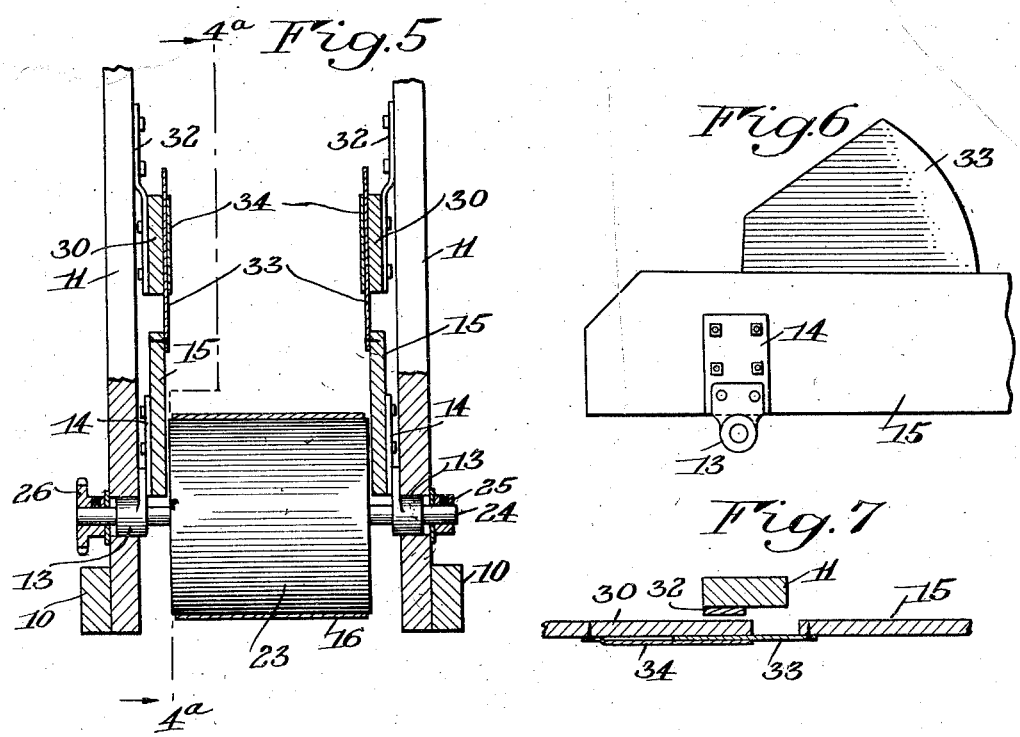
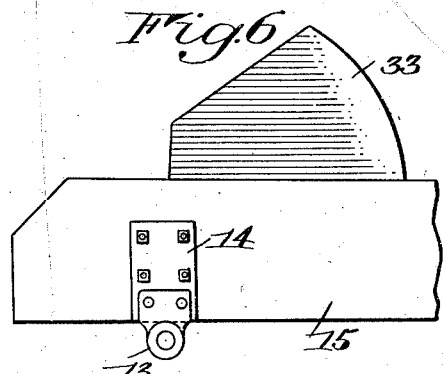
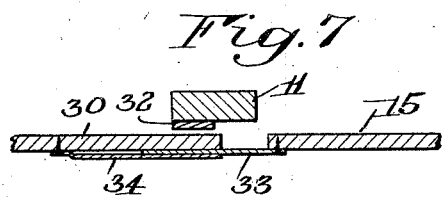
INVENTOR
William E. Ghent
BY Edward H. Dumpston
his ATTORNEY Patented Jan. 26, 1932

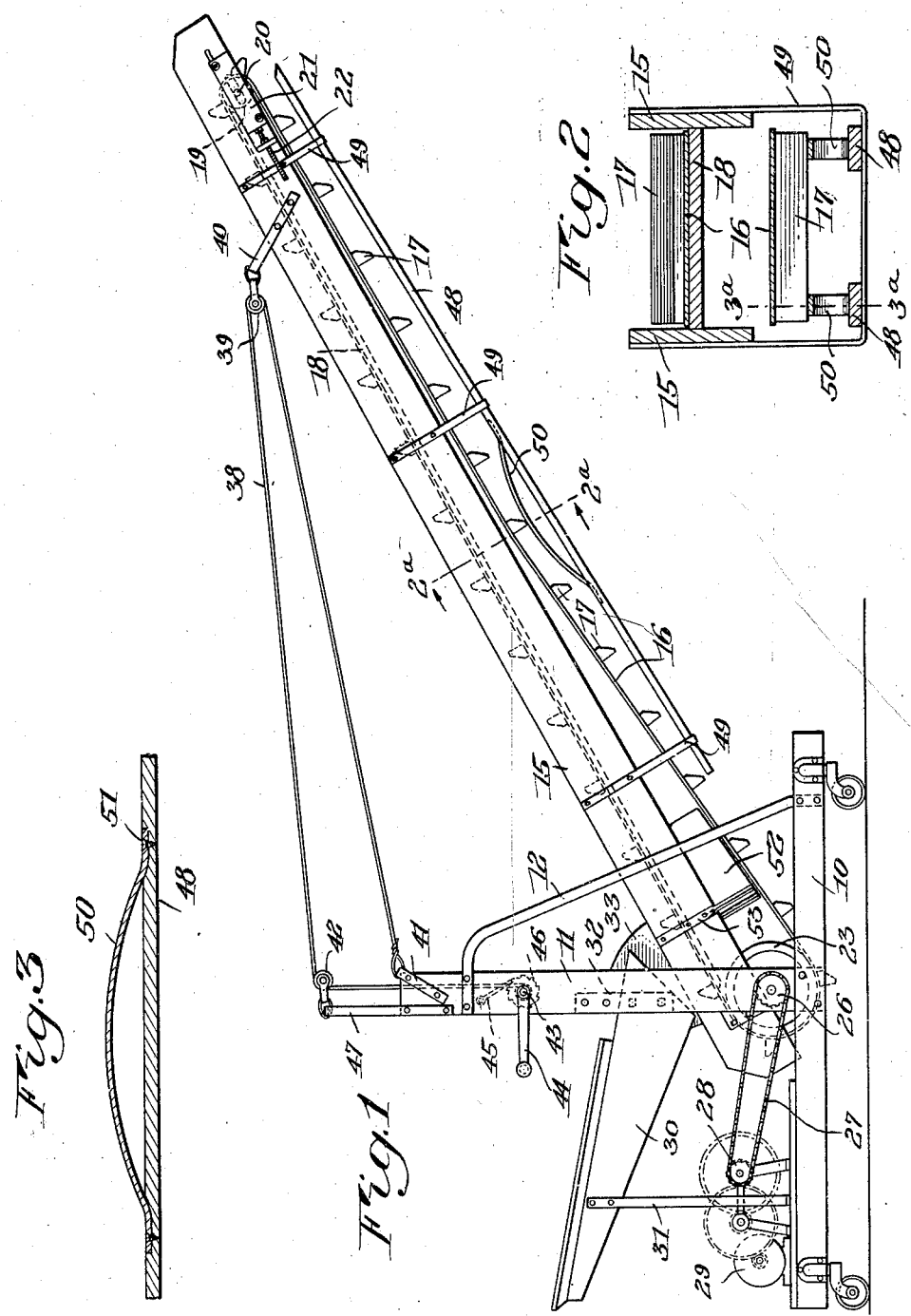

1,842,399

UNITED STATES PATENT OFFICE

WILLIAM E. GHENT, OF ATLANTA, NEW YORK, ASSIGNOR TO BOGGS MANUFACTURING CORPORATION, OF ATLANTA, NEW YORK, A CORPORATION OF NEW YORK

LOADING MACHINE

Application filed November 3, 1930. Serial No. 492,941.

The present invention relates to a loading machine and has for its object to provide improvements in machines of this class whereby to afford a practical and efficient loading device capable of handling various materials under different operating conditions.

A further object of the invention is to provide in a portable loader of the endless conveyer type improvements by which to effect economy in the construction, operation, and maintenance of the machine.

A further object of the invention is to provide an improved mounting for the conveyer and the operating parts therefor.

A further object of the invention is to provide improved connecting means between the swingingly mounted conveyer frame and a chute for delivering materials to the conveyer.

A further object of the invention is to provide in a bin loading machine of the endless conveyer type improved means for protecting the conveyer from injury by contact with the walls of the bin over which it is operated in delivering materials to the bins.

A still further object of the invention is to provide means for deflecting foreign materials from the lower flight of the conveyer belt which may accumulate thereon during operation of the machine, whereby to protect the conveyer from injury by the passage of such materials between the belt and the driving means therefor.

To these and other ends the invention resides in certain improvements and combinations of parts, all as will be hereinafter more fully described, the novel features being pointed out in the claims at the end of the specification.

In the drawings:

Fig. 1 is a side elevation of a portable loading machine embodying the invention;

Fig. 2 is a transverse section through the elevator drawn to an enlarged scale and taken on line 2a—2a of Fig. 1;

Fig. 3 is a fragmentary section taken on line 3a—3a of Fig. 2;

Fig. 4 is a fragmentary sectional elevation taken on line 4a—4a of Fig. 5;

Fig. 5 is a transverse section taken on line 5a—5a of Fig. 4;

Fig. 6 is a view in elevation showing the construction of the lower end of one of the side rails of the elevator frame, and Fig. 7 is a sectional plan taken on line 7a—7a of Fig. 4.

Similar reference numerals throughout the several views indicate the same parts.

The present invention embodies a loading machine, preferably of the portable type, and is designed particularly for use in the handling of vegetables and other materials where for example it is desired to store them in bins or to deliver them to compartments or receptacles of various kinds.

Referring to the drawings 10 designates a wheeled base or truck having standards 11 extending upwardly therefrom which are braced and supported by the forwardly disposed struts 12 as shown in Fig. 1. The standards have journalled in their lower ends, adjacent the base, sleeve like bearings 13 which are suitably connected by plate like brackets 14 to the side rails 15 of the elevator frame whereby to permit the latter to swing upon the truck to different inclined positions, depending on the height of the wall of the bin or receptacle over which the endless conveyer 16 is to be operated. The conveyer may be of any suitable type but preferably comprises a belt provided with cleats 17 or other suitable means for supporting the materials during advancement of the belt. The side rails 15 are connected by a longitudinal extending member 18 on which the belt travels when the machine is in operation. At the outer end of the side rails the belt is supported by a pulley 19 having trunnions 20 journalled in bearing members 21 supported on the side rails for adjustment by means of screws 22 to properly tension the belt from time to time. At the inner or lower end of the conveyer frame the belt is carried by a driving pulley 23 fixed on a shaft 24 extending through and journalled in the bearings 13 which pivotally support said frame for movement to different inclined positions with respect to the base. The shaft 24 is held against longitudinal movement by a collar 25 on one end and by a driving sprocket 26 on its opposite end. The sprocket is operated preferably by a chain 27 driven by a sprocket 28 which in turn is driven by an electric motor 29 through a train of gears as indicated in Fig. 1, said motor and gears being preferably mounted on the rear end of the truck. A chute 30 is provided for delivering the materials to the conveyer belt and is secured at the desired height by suitable supports 31 extending upwardly from the truck and connected with the sides of the chute by any preferred means. Additional supporting means is provided for the chute at its front end comprising straps 32 suitably connected with the chute and with the upright frame members 11.

Improved means is provided for closing the openings between the side walls of the conveyer and those of the chute to prevent the escape of the materials while descending within the chute and discharging to the conveyer belt. This means comprises plates 33 secured upon the side walls of the conveyer frame by any suitable means and extending upwardly between the side walls of the chute and the plates 34 secured thereto which are offset therefrom an amount substantially equal to the thickness of the plates 33 as shown in Fig. 7. With this telescoping arrangement the plates 33 on the conveyer are free to move between the side walls of the chute and the plates 34 thereon and serve in all positions of the conveyer to prevent lateral escape of the materials moving downwardly in the chute at points between the side walls of the chute and those of the conveyer. This is true regardless of whether or not the conveyer frame is in its extreme raised or lowered positions upon the base.

At the front end of the chute a bottom plate 35 is pivotally connected therewith at 36 and is prevented from dropping by a stop 37 suitably connected with the chute. The plate 35 is hinged, as shown, for the purpose of permitting it to swing upwardly in case any of the materials should discharge downwardly on the belt past the lower edge of the plate and later be raised into engagement therewith by the cleats on the belt during operation of the machine.

Any suitable means may be provided for raising and lowering the conveyer frame by swinging it upon its pivotal axis, but I prefer to employ for this purpose a cable 38 extending over a pulley 39 suitably connected with a yoke 40 having its ends attached to the outer ends of the side walls of the conveyer frame as shown in Fig. 1. The cable is secured at one end to a strap 41 on one of the standards 11 and has its other end extended over a pulley 42 and downwardly between the standards where it is attached to a shaft 43 having its opposite ends journaled in said standard. The shaft is operated to wind the cable thereon by means of a crank 44 and a pawl 45 cooperates with a ratchet 46 on the shaft 43 to hold the latter against rotation. The pulley 42 is suitably connected with and supported by an arm 47 extending upwardly from one of the standards 11 as shown in Fig. 1.

Means is provided for preventing the belt from coming in contact with the wall of a bin or other compartment over which it operates when delivering the materials to said compartment. For example, where the machine is used to deliver potatoes or other vegetables to a bin in which they are to be stored, a number of sections of the front wall of the bin are first removed so that the conveyer can be lowered with its outer or discharge end relatively close to the floor at the back end of the bin where the loading operations are usually begun. As the materials begin to pile up it is necessary to gradually elevate the conveyer and to add additional sections to the front wall of the bin. It is also necessary to move the machine outwardly from said wall from time to time as the loading operations progress. Furthermore during the loading operations it is desirable to operate the conveyer as close to the uppermost section of the front wall of the bin as possible and in doing so it is also necessary to prevent the cleats or other carrying elements on the belt from coming in contact with the top-most section of the front wall of the bin to avoid injury to the belt. The means provided for preventing the belt or the cleats thereon from contacting with said wall sections preferably comprises a pair of spaced bars or guard rails 48 disposed beneath and extending longitudinally of the conveyer frame and connected with the latter by a plurality of yokes or straps 49 as best shown in Figs. 1 and 2. By locating the bars beneath the belt as shown they will engage the wall of the bin in advance of the belt in case the conveyer frame is dropped below the desired operating position in which event the cleats will be prevented from contacting with said wall.

Furthermore means is provided for preventing the sagging of the belt beneath the conveyer frame whereby to afford clearance between the cleats and the rails 48 in order to insure quietness of operation by tensioning the belt and avoiding vibration of the cleats in engagement with the guard rails. This means comprises a pair of bowed strips 50 each extending longitudinally of and supported by one of the rails 48 as shown in Figs. 1 and 2. These elements are located intermediate the ends of the rails in the path of the cleats and over which they travel during operation of the machine. The bowed elements are preferably in the form of metal strips and their ends are positioned in recesses formed in the bars in which they are secured by screws 51 as shown in Fig. 3. The upper surfaces of the strips are inclined relative to the rails 48 to facilitate the passage of the cleats over said strips which operate to tension the belt and to prevent undue vibration thereof.

Means is provided above the lower flight of the belt at a point slightly in advance of the driving pulley 23 for deflecting any foreign materials which may accumulate upon and be carried downwardly by this portion of the belt before they have an opportunity to reach said driving pulley and interfere with the operation of the belt. This means comprises a guard 52 in the form of a deflector which extends diagonally across the upper surface of the lower flight of the belt with its bottom edge disposed relatively close to the belt as shown in Fig. 4. The deflector is preferably supported by a pair of straps 53 located at each end thereof and suitably connected with the sides of the conveyer frame as shown in Fig. 1.

While the present loading machine is especially adapted for delivering potatoes and other vegetables to storage bins and the like it will be understood that the machine is one which may be used in the handling of other materials where it is desired to deliver the same to different types of carriers, receptacles or compartments of any kind.

I claim:

1. In a loading machine, the combination of a base, a conveyer frame having alined bearing members journaled in the base and supporting said frame for a swinging movement to different positions upon the base, a driving element having supporting portions journaled in said bearing members, a conveyer belt associated with said frame and connected with said driving element for operation thereby, means adjustable to support said frame in different positions upon the base, guard means for the belt disposed beneath said frame and said belt, supporting means for said guard means depending from said frame, and one or more arched members extending upwardly from the guard means in the path of the lower flight of the belt for tensioning the latter.

2. In a bin loading machine, the combination of a wheeled truck, a conveyer frame mounted to swing upon the truck to different inclined positions, a conveyer belt carried by said frame for operation over the wall of the bin in the different positions of the frame, guard means for the belt spaced from the frame beneath the belt and arranged to overlie said wall during the loading operations whereby to prevent the belt from contacting with said wall, parts extending downwardly from the frame and forming supporting means for said guard means, and tensioning members for the belt extending upwardly from and inclined relative to said guard means on which the belt is arranged to travel whereby it is held out of contact with the guard means.

3. In a portable bin loading machine, the combination of a wheeled base, a conveyer frame mounted to swing upon the base to different inclined positions, means for adjustably supporting said frame in said positions, a conveyer belt carried by said frame for operation over the wall of the bin, spaced cleats on the belt, guard means for the belt comprising space bars extending longitudinally beneath the frame and belt in position to overlie said wall during the loading operations whereby to prevent the belt from contacting therewith, spaced supporting elements for said bars carried by and extending downwardly from the frame, and an arched tensioning member for the belt supported by each of the bars and by which the cleats are elevated during operation of the belt.

4. In a portable bin loading machine, the combination of a wheeled base, a conveyer frame mounted to swing upon the base to different inclined positions, means for adjustably supporting said frame in said positions, a conveyer belt carried by said frame for operation over the wall of the bin including spaced cleats, guard means for the belt comprising spaced bars extending longitudinally beneath the frame and belt in position to overlie said wall during the loading operations whereby to prevent the cleats from contacting therewith, spaced supporting elements for said bars carried by and extending downwardly from the frame, and a tensioning strip for the belt mounted on and arched above each of said bars in the path of the cleats for engaging and holding them out of contact with the bars during operation of the machine.

5. In a portable bin loading machine, the combination of a wheeled base, a conveyer frame mounted to swing upon the base to different inclined positions, means for adjustably supporting said frame in said positions, a conveyer belt carried by said frame for operation over the wall of the bin including spaced cleats, guard means for the belt comprising space bars extending longitudinally beneath the frame and belt in position to overlie said wall during the loading operations to prevent the cleats from contacting therewith, spaced supporting elements for said bars carried by and extending downwardly from the frame, and a member extending upwardly from each of said bars in the path of said cleats, said members having their upper surfaces inclined relative to the bars and engaging the cleats during advancement of the belt to hold them out of contact with the bars.

6. In a portable bin loading machine, the combination of a wheeled truck, a conveyer frame mounted to swing to different inclined positions upon the truck, a conveyer belt carried by said frame for operation over the wall of the bin in the different positions of the frame, a driving element for the belt located adjacent the lower end of the frame, guard means for the belt spaced from the frame beneath the belt and arranged to overlie said wall during the loading operations whereby to prevent the belt from contacting therewith, members extending downwardly from the frame and forming supporting means for said guard means, means for tensioning and holding the belt out of contact with said guard means during operation of the machine comprising arched members overlying the guard means beneath the belt, and means interposed between the upper and lower flights of the belt in advance of said driving element operating to deflect from said lower flight materials accumulating thereon during operation of the machine.

7. In a loading machine, the combination of a base, a conveyor frame mounted to swing upon the base to different inclined positions, means for adjustably supporting the frame in said positions, a conveyor belt carried by said frame provided with spaced cleats, operating means for the belt, means on the frame for holding the upper flight of the belt against sagging, a support connected with and extending longitudinally of the frame beneath the lower flight of the belt, and one or more members on said support having arched tracks disposed at a predetermined point in the path of the cleats and arranged to elevate the latter while passing said point.

8. In a loading machine, the combination of a base having spaced standards extending upwardly therefrom, a conveyor frame comprising spaced side rails having laterally extending sleeve bearings fixed thereon and rotatably positioned within said standards to permit the conveyor frame to swing to different inclined positions relative to the base, means carried by the standards for raising and lowering said conveyor frame, a transversely extending shaft having its opposite ends journaled in said sleeve bearings, a driving element on said shaft, a conveyor belt between said side frames arranged to be driven by said driving element, and means on the base for driving said shaft.

9. In a loading machine, the combination of a base having spaced standards extending upwardly therefrom, an inclined conveyor frame comprising spaced side rails having their lower ends extending between the standards, bearings fixed on the lower ends of the side rails and extending laterally therefrom and rotatably received within said standards to permit the conveyor frame to swing to different inclined positions relative to the base, means carried by the standards for raising and lowering said conveyor frame, a conveyor belt supported by said frame for travel between the side rails, a chute fixed on the base comprising bottom and side walls the lower end of the bottom wall overlying the conveyor belt and the inner ends of the side walls extending between said standards above the side rails and substantially in the plane thereof, supporting means for the chute connecting the inner ends of the side walls with said standards, guide plates secured on the inner faces of the side walls of the chute in spaced parallel relation to the inner end portions of said walls and cooperating with said portions to form guideways, and upstanding plates secured to the side rails of the conveyor frame and extending within said guideways and being free to move therein upon swinging said conveyor frame to different inclined positions.

WILLIAM E. GHENT.